United States Patent
Minami et al.

[19]

[11] Patent Number: 6,155,633
[45] Date of Patent: Dec. 5, 2000

[54] BUMPER-MOUNTING STRUCTURE FOR FRAME-MOUNTED-BODY VEHICLE

[75] Inventors: Hidekazu Minami; Akinao Shibata, both of Kanagawa, Japan

[73] Assignee: Isuzu Motors Limited, Tokyo, Japan

[21] Appl. No.: 09/200,473

[22] Filed: Nov. 27, 1998

[30]   Foreign Application Priority Data

Nov. 30, 1997   [JP]   Japan ................................. 9-344172

[51] Int. Cl.$^7$ ................................................. B62D 25/08
[52] U.S. Cl. .......................... 296/194; 296/188; 293/115; 293/154; 293/155
[58] Field of Search ..................... 296/188, 194, 296/203.02, 30; 293/115, 154, 155

[56]          References Cited

U.S. PATENT DOCUMENTS 5,123,695   6/1992   Kanemitsu et al. ..................... 296/194

5,597,198   1/1997   Takanishi et al. ....................... 296/194

FOREIGN PATENT DOCUMENTS 4-109657   9/1992   Japan .

*Primary Examiner*—D. Glenn Dayoan
*Assistant Examiner*—Jason Morrow
*Attorney, Agent, or Firm*—Sughrue, Mion, Zinn, Macpeak & Seas, PLLC

[57]                ABSTRACT

A bumper-mounting bracket 3, comprising a cab mount bracket lower 1 and a cab mount bracket upper 2 which are fixedly connected together, and a bumper-mounting side bracket 4 are fixedly secured to each deflector panel 24 of a front end panel 21 of a frame-mounted-body vehicle. A bumper reinforcement 15 is fixedly secured to the front end panel 21 in such a manner that each upper bumper stay 16 and each lower bumper stay 17 are connected respectively to the bumper-mounting bracket 3 and a front end lower panel 23, and that mounting holes 18, formed in each of opposite end edge portions of the bumper reinforcement, are engaged with the bumper-mounting side bracket 4.

3 Claims, 3 Drawing Sheets

BUMPER-MOUNTING STRUCTURE FOR FRAME-MOUNTED-BODY VEHICLE

BACKGROUND OF THE INVENTION

1. Field of the Invention

This invention relates to a bumper-mounting structure for a frame-mounted-body vehicle in which a bumper is mounted on a body of the frame-mounted-body vehicle (having the body mounted on a chassis frame) so as to aesthetically enhance the appearance and also to prevent damage to equipment, mounted on a front end panel, in the event of a low-speed collision.

2. Related Art

In the case of a frame-mounted-body vehicle having a body mounted on a chassis frame, a bumper is usually fixed to the frame. This is intended to reduce damage to the body in the event of a collision and also to enhance the durability of the body so as to prevent damage to the body when putting the foot on the bumper. In the case of the frame-mounted-body vehicle, it is necessary to form a small gap is between the frame and the body and to provide a rubber member between the frame and the body so that the rubber member can be elastically deformed during the running of the vehicle, thereby preventing the frame and the body from contacting each other. Therefore, a gap is also formed between the body and the bumper, and there has been encountered a problem that the front view, which has the greatest influence on the commercial value of the vehicle, is inferior in refinement, quality, high-grade impression and so on to that of a passenger car.

In a frame-mounted-body vehicle having a bumper mounted on a frame, there has heretofore been adopted means by which the above-mentioned gap is reduced, and one example thereof is disclosed in Japanese Utility Model Unexamined Publication No. 4-109657. In this "bumper-mounting structure for an automobile", an attachment is interposed between a mounting bracket, fixed to a front end of a chassis frame, and a bumper, and a slot is formed between the attachment and the mounting bracket. The position of mounting of the bumper is adjusted by this slot, thereby reducing the above gap. With this means, however, there is a problem that because of a relative movement between the body and the frame, the adjustment can be effected only in the range in which the two are not in contact with each other.

In order to mount a bumper on a body of a frame-mounted-body vehicle, it is necessary to enhance the rigidity of a front end panel of the body, and for example, as shown in FIG. 1, there has been used a method in which pillar-like members (not shown) of high rigidity are interposed between a front end upper panel 22 and a front end lower panel 23, and the bumper is mounted on the pillar-like members. With this method, however, an impact force, applied to the bumper at the time of a collision, acts on the front end upper panel 22, the front end lower panel 23 and deflector panels 24, provided therebetween, through the pillar-like members, so that these members may be deformed, and besides there is a possibility that high-grade parts, including head lights, a radiator grill and an air condenser, are destroyed. Recently, in order to reduce an automobile insurance rate, it has been required to reduce the cost of repair resulting from a collision, and therefore this method is not so advantageous. And besides, the pillar-like members of high rigidity are used, and therefore there is encountered a problem that the weight of the vehicle and the cost are increased.

SUMMARY OF THE INVENTION

This invention seeks to solve the above problems, and an object of the invention is to provide a bumper-mounting structure for a frame-mounted-body vehicle in which a bumper is mounted on a body to thereby eliminate the above-mentioned gap so as to aesthetically enhance the appearance, and also damage to the body and equipments, mounted on the body, is reduced in the event of a collision.

The above object has been achieved by a bumper-mounting structure of the present invention for a frame-mounted-body vehicle comprising a front end upper panel, a front end lower panel and deflector panels provided between the front end upper and lower panels, being connected to a bumper reinforcement, provided in that a cab mount bracket lower mounted on a chassis frame through a cab mount rubber member brackets and a cab mount bracket upper, fixedly secured to each other are mounted on the front end panel, and bumper stays, fixedly mounted on the bumper reinforcement, are fixedly secured respectively to the front end panel. A bumper-mounting side bracket is fixedly mounted on each of the deflector panels, and opposite end edge portions of the bumper reinforcement are fixedly secured to the side brackets, respectively.

With this construction, because the cab mount bracket lower of high rigidity and the cab mounted bracket upper are mounted on the front end panel an impact force, applied to the bumper, can be received by the cab mount bracket lower and others. Therefore, the effect of the impact force on the front end panel is reduced, and damage to the front end panel is prevented, and also damage to equipments, mounted on the front end panel, is prevented. And besides, there is no need to use the above-mentioned pillar-like members or the like, and the weight of the vehicle and the cost will not be increased.

BRIEF DESCIPTION OF THE DRAWINGS

DETAILED DESCRIPTION OF THE PREFERRED EMBODIMENTS

Figure 1:
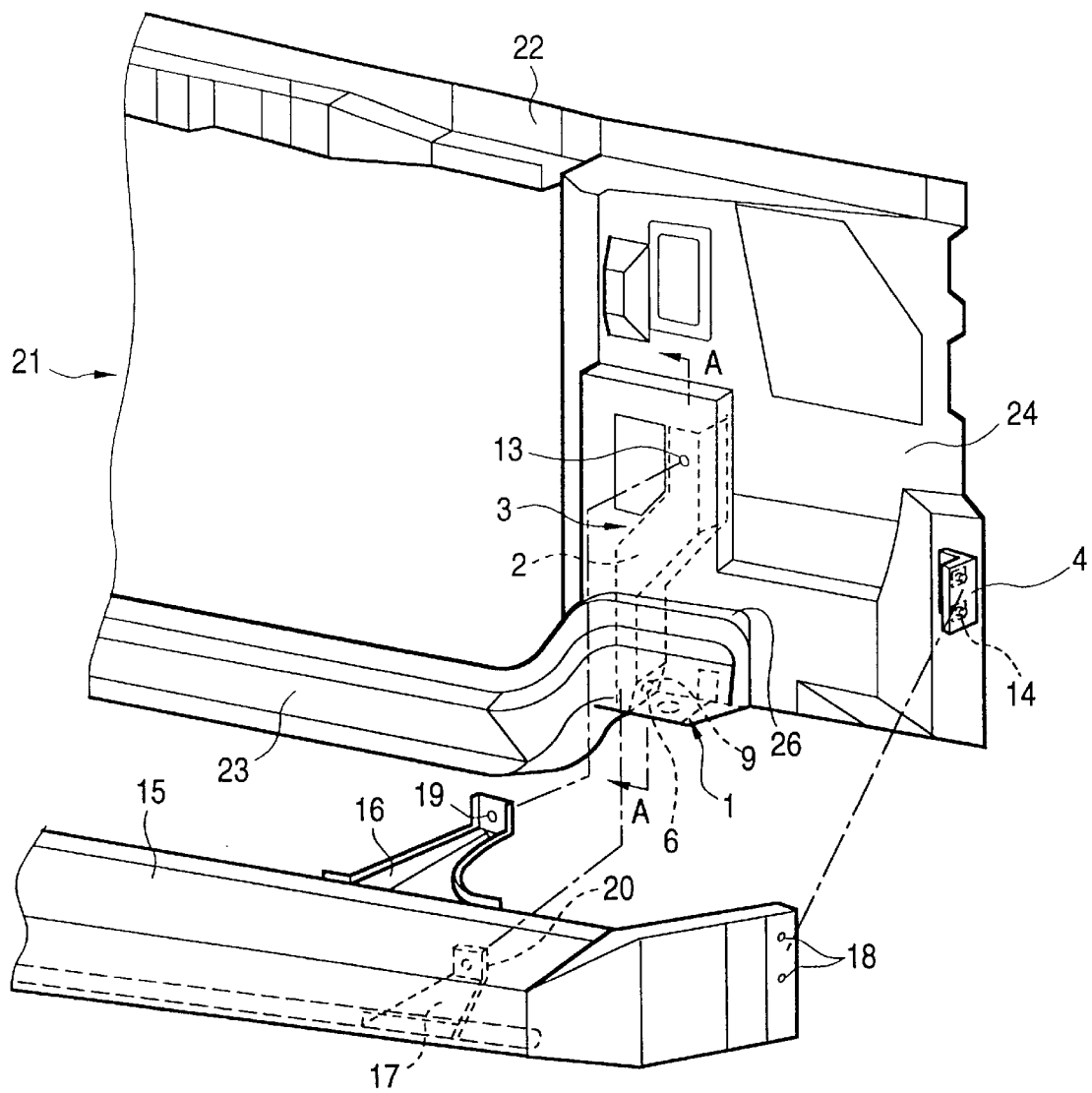
FIG. 1 is a perspective view showing an overall construction of a bumper-mounting structure of the present invention for a frame-mounted-body vehicle.

A preferred embodiment of a bumper-mounting structure of the present invention for a frame-mounted-body vehicle will now be described in detail with reference to the drawings. FIG. 1 shows a general construction of that portion of the frame-mounted-body vehicle (to which the present invention is applied) including a front end panel 21 and its neighboring portions. The front end panel 21 comprises a front end upper panel 22 provided at an upper side, a front end lower panel 23 provided at a lower side, and deflector panels 24 provided between the front end upper and lower panels at opposite end portions thereof. Although the detailed construction is not shown, the front end lower panel 23 is fixed to the deflector panels 24 through a closing front end lower panel 26. Fixing nuts 9 are fixedly secured to an inner surface of the front end lower panel 23.

Figure 3:
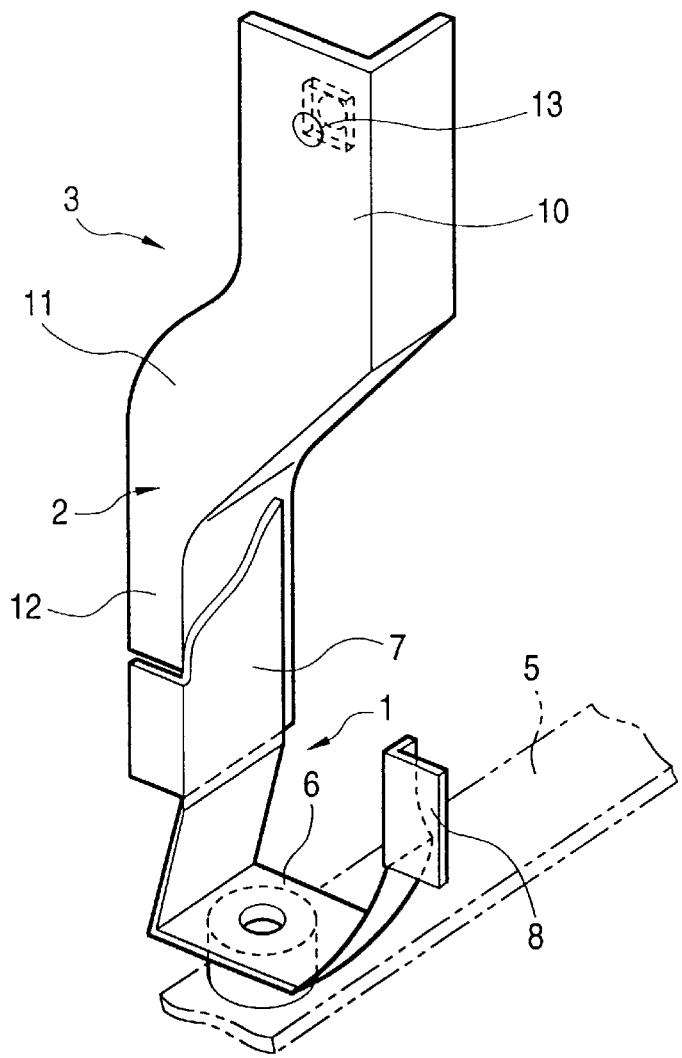
FIG. 3 is a perspective view showing a detailed construction of a bumper-mounting bracket used in the bumper-mounting structure of the invention for the frame-mounted-body vehicle.

FIG. 3 shows a bumper-mounting bracket 3 comprising a cab mount bracket lower 1 and a cab mount bracket upper 2 fixedly secured to the cab mount bracket lower 1.

The cab mount bracket lower 1 is made of a relatively rigid material, and in this embodiment, this bracket 1 includes a mounting surface 6 to be mounted on a chassis frame 5 (indicated in dots-and-dash lines), an upper bent portion 7, extending upwardly, and a side bent portion 8 projecting laterally.

The cab mount bracket upper 2 is formed by bending a member of an L-shaped transverse cross-section into a configuration shown in the drawings. More specifically, the cab mount bracket uppr 12 includes an upper surface portion 10, a slanting bent portion 11 extending from the upper surface portion 10 in a slanting manner, and a lower surface portion 12 extending downwardly. The cab mount bracket upper 2 is formed into such a configuration merely for conforming its shape to that of the front end panel 21, and there is not any other particular reason for this. A fixing nut 13 is fixedly secured to the upper surface portion 10.

Figure 2:
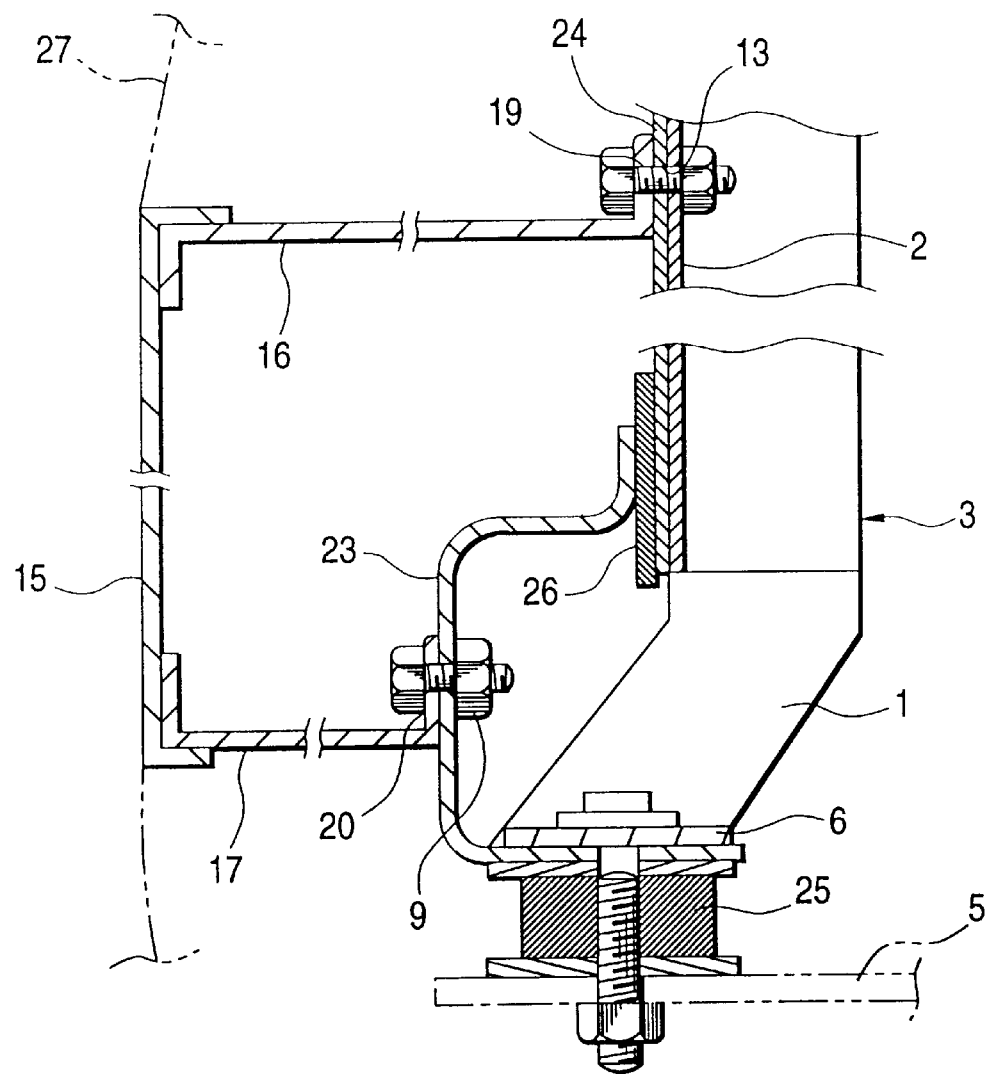
FIG. 2 is an enlarged cross-sectional view taken along the line A—A of FIG. 1.

As shown in FIG. 3, by fixedly securing the upper bent portion 7 of the cab mount bracket lower 1 to the lower surface portion 12 of the cab mount bracket upper 2, the cab mount bracket lower 1 and the cab mount bracket upper 2 are combined together to form the bumper-mounting bracket 3 of an unitary construction. FIGS. 1 and 2 show a condition in which this bumper-mounting bracket 3 is mounted on the front end panel 21. More specifically, the bumper-mounting bracket 3 is fixedly secured to the deflector panel 24 in such a manner that the upper surface portion 10, the slanting bent portion 11 and the lower surface portion 12 of the cab mount bracket upper 2, as well as the side bent portion 8 of the cab mount bracket lower 1, are held in contact with a reverse surface of the deflector panel 24. In this condition, the fixing nut 13 is also held against the reverse surface of the deflector panel 24.

Figure 4:
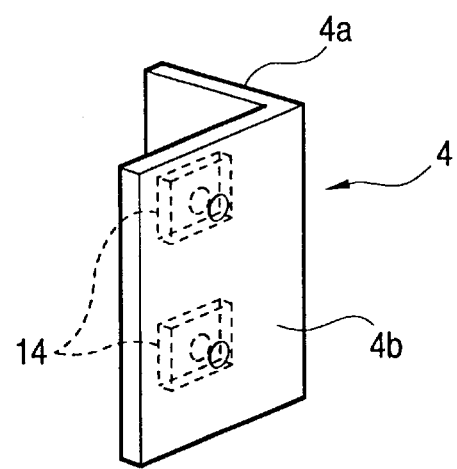
FIG. 4 is a perspective view showing a detailed construction of a bumper-mounting side bracket used in the bumper-mounting structure of the invention for the frame-mounted-body vehicle.

As shown in FIG. 1, a bumper-mounting side bracket 4 is fixedly secured to a side end portion of each deflector panel 24. The bumper-mounting side bracket 4 has a configuration shown in FIG. 4. More specifically, this bracket 4 comprises a member of an L-shaped transverse cross-section, and one side surface 4a thereof is fixedly secured to the deflector panel 24, and mount fixing nuts 14 and 14 are provided on another side surface 4b.

As shown in FIG. 1, an upper bumper stay 16 and a lower bumper stay 17 are mounted on and project from each of opposite end portions of a bumper reinforcement 15 to be fixedly secured to a bumper 27 (FIG. 2), and mounting holes 18 and 18 are formed through each of opposite end edge portions of the bumper reinforcement 15. The upper bumper stay 16 has a foot portion 19, and the lower bumper stay 17 has a foot portion 20. The upper bumper stay 16 and the lower bumper stay 17 are not limited respectively to the shapes shown in the drawings.

Next, a method of fixing the bumper reinforcement 15 to the front end panel 21 will be described. As shown in FIGS. 1 and 2, the foot portion 19 of the upper bumper stay 16 of the bumper reinforcement 15 is engaged with and connected to the fixing nut 13 of the bumper-mounting bracket 3. On the other hand, the foot portion 20 of the lower bumper stay 17 is held against the front surface of the front end lower-panel 23, and fixedly secured thereto by the mounting nut 9. The mounting holes 18 and 18, formed through the end edge portion of the bumper reinforcement 15, are engaged respec- tively with the fixing nuts 14 and 14 of the bumper-mounting side bracket 4. These engaged portions are fastened by bolts and nuts, thereby fixing the bumper reinforcement 15 to the front end panel 21. By suitably determining the lengths of the upper bumper stay 16 and lower bumper stay 17 of the bumper reinforcement 16, a gap between the body and the bumper 27 can be eliminated. Namely, in this embodiment, the bumper 27 is connected to the body, and therefore even if there is no gap between the bumper and the body, the two will not interfere with each other.

As described above, the bumper 27 is directly fixed to the front end panel 21 of the body through the bumper rein- forcements 15, and therefore although an impact force, applied to the bumper 27, acts on the front end panel 21, most of this impact force is received by the cab mount bracket lowers 1 of high rigidity. The cab mount bracket lower 1 has high rigidity, and is connected to the chassis frame 5 through a cap mount rubber member 25, and therefore the impact force is little transmitted to the front end panel 21. Therefore, damage to the front end panel 21 and equipment, mounted thereon, is prevented.

In the above description, although the front end panel 21 and the bumper reinforcement 15 are connected together by the use of the bumper cab mount bracket upper 3, the use of the mounting brackets 2 may be omitted, in which case the front end panel and the bumper reinforcement are connected together by bumper-mounting brackets each comprising only a bumper-mounting bracket lower. As described above, the bumper-mounting bracket 3 conforms in configuration to the front end panel 21, and is not limited to the illustrated configuration. As described above, the constructions of the upper bumper stay 16 and lower bumper stay 17 of the bumper reinforcement 15, as well as the construction of the side bracket 4, are not limited respectively to the illustrated constructions. If the strength of connection to the bumper reinforcement 15 only by the bumper 15 mounting brackets 3 is high, it is not necessary to connect the bumper rein- forcement 15 to the bumper side brackets 4. In contrast, a larger number of brackets may be mounted on the front end panel 21 so that the bumper reinforcement 15 can be connected to the front end panel through these brackets.

In the bumper-mounting structure for the frame-mounted- body vehicle of the present invention, the bumper of the frame-mounted-body vehicle is connected to the bumper- mounting bracket fixedly secured to the front end panel, and therefore an impact force, applied to the bumper, is received by the bumper-mounting bracket and is little transmitted to the front end panel. Therefore, damage to the front end panel, as well as damage to the equipment mounted thereon, is reduced. And besides, since the bumper and the body are connected together, a gap between the two can be eliminated so as to aesthetically enhance the appearance. Furthermore, it is not necessary to reinforce the front end panel by pillar-like members or the like as used in the conventional construction, and the increase of the weight and the increase of the cost can be prevented.

In the bumper-mounting structure for the frame-mounted- body vehicle of the present invention the opposite end edge portions of the bumper are connected respectively to the opposite end edge portions of the front end panel, and with this construction, the rigidity of supporting of the bumper is enhanced, and damage to the front end panel is further reduced.

What is claimed is:

1. A bumper-mounting structure for a frame-mounted- body vehicle, comprising:

a front end panel, comprising a front end upper panel, a front end lower panel and deflector panels provided between said front end upper and lower panels;

a bumper reinforcement connected to said front end panel;

a cab mount bracket mounted on said front end panel and a chassis frame through a cab mount rubber member; and bumper stays fixedly mounted on said bumper reinforcement, said bumper stays fixedly secured respectively to said front end panel.

2. A bumper-mounting structure for a frame-mounted-body vehicle according to claim 1, further comprising:

a bumper-mounting side bracket fixedly mounted on each of said deflector panels, and opposite end edge portions of said bumper reinforcement being fixedly secured to said side brackets, respectively.

3. A bumper-mounting structure for a frame-mounted-body vehicle according to claim 1, wherein said cab mount bracket is defined by a cab mount bracket upper and a cab mount bracket lower.

* * * * *